July 30, 1957

W. E. EVANS 2,800,714

CAKE CUTTER AND SERVER

Filed June 25, 1954

Walter E. Evans
INVENTOR.

BY *[signature]*
Attorneys

United States Patent Office 2,800,714
Patented July 30, 1957

2,800,714

CAKE CUTTER AND SERVER

Walter E. Evans, North Manchester, Ind.

Application June 25, 1954, Serial No. 439,315

2 Claims. (Cl. 30—114)

The present invention relates to kitchen implements and utensils, generally speaking, and has more particular reference to a handily usable manually actuatable implement which constitutes a cutter and server for a slice of pie or cake, as the case may be.

An object of the invention is to structurally, functionally and otherwise improve upon similarly constructed and performing multipurpose hand implements in the field of invention above stated and, in doing so, to provide a construction in which manufacturers and users will find their respective requirements and needs aptly taken into account and suitably met.

Another object of the invention is to provide a simple, practical and economical hand implement which is characterized by a pair of handles which are movable toward and from each other and which have corresponding or the same ends interconnected by way of a spring and which have free outer ends, the latter ends being provided with cooperating blade-like portions, one of which constitutes a spatula-like slice pick-up and serving blade, and the other of which is at right angles thereto and has a suitable cutting edge.

More specifically, novelty is predicated on the construction stated wherein the cutting blade has saw teeth serving as the cutting elements and said plate being oblique-angled in respect to the normal using plane of a serving blade to assist in making the cut, and when it comes into contact with the serving plade, constituting a wall which assists in picking up the slice and serving it with little or no difficulty or trouble.

Other objects, features and advantages will become more readily apparent from the following description and the accompanying sheet of illustrative drawings.

Figure 1:
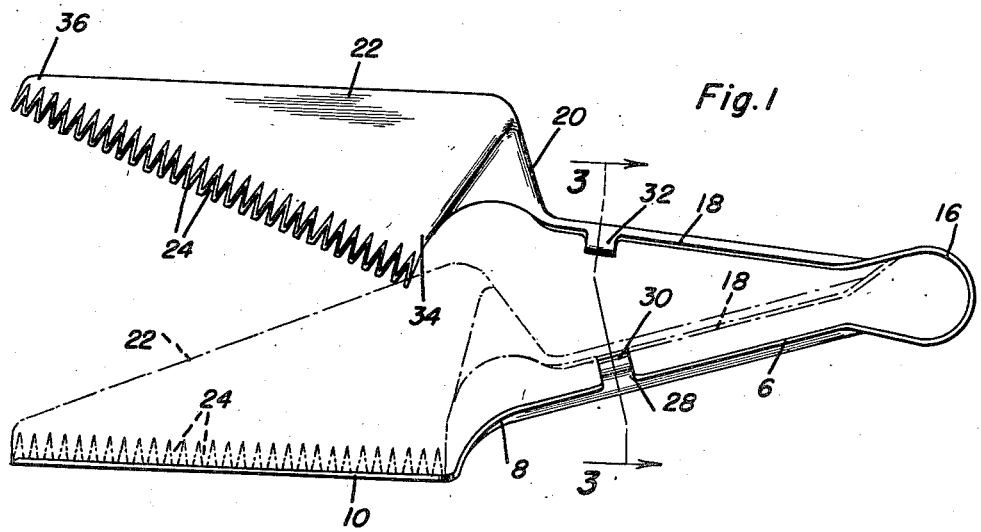
Figure 1 is an elevational view of a multipurpose cake cutter and server constructed in accordance with the principles of the present invention.

Referring now to the drawings by way of reference numerals and accompanying lead lines, the implement comprises a one-piece structure of appropriate sheet material. It is probable that stainless steel, or the like, would be employed although it is within the purview of the invention to utilize, if found to be more practicable, commercial plastics of an appropriate grade. The lower handle, which is of appropriate cross-section is substantially straight and is denoted by the numeral 6. It is connected by way of an offsetting bend 8 to a flat surfaced suitably shaped spatula-like blade or plate 10. Certain marginal edges of the latter are preferably beveled as at 12 to facilitate feeding the blade beneath the bottom of the cake or pie which is to be cut into slices. The other marginal edge 14 will be substantially straight from end to end. The other end of this handle 6 connects by way of a suitably bent and tensioned spring 16 to the cooperating end of a similar what may be called upper handle 18. Here again there is a lateral offsetting bend 20 which is joined with a substantially triangulated complemental blade 22, the latter being provided on its lower effective edge with cutting teeth here referred to as saw teeth 24.

Figure 2:
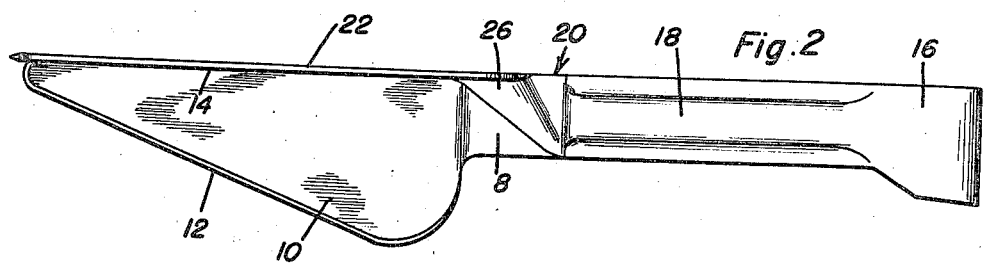
Figure 2 is a top plan view of the same.
Figure 3:
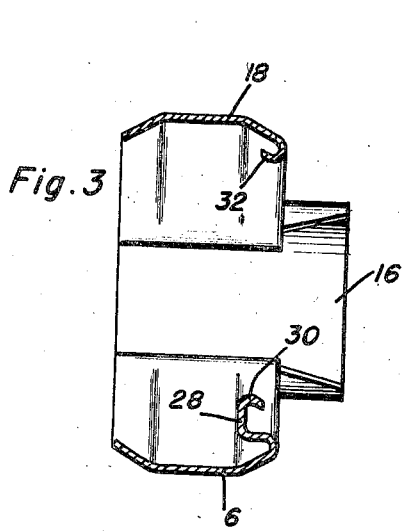
Figure 3 is a section on the irregular line 3—3 of Figure 1 looking in the direction of the arrows.

The nature of the bend 20 is such that it may be described as substantially V-shaped with the portion 26 thereof serving to provide a twist which in turn disposes the cutting blade 22 in a position at right angles to the blade 10 and also puts it in a position to move toward and from the edge 14 so that the two blades together form a trough-like holder and server when they are in the closed position shown in dotted lines in Figure 1 and in full lines in Figure 2.

Figure 4:
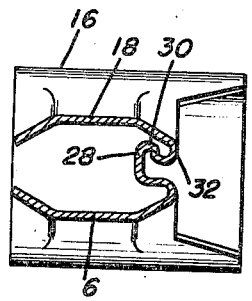
Figure 4 is a cross-section based on Figure 3 and showing the handles latched together.

It is desirable that when the device is not in use, the saw teeth of the cutting blade should be pressed and held against the serving blade 10 so that the latter then forms a sort of a temporary guard. To accomplish this the intermediate longitudinal edge portion of the handle 6 is provided with a laterally disposed lug 28 having a terminal keeper hook 30 to accommodate a complemental keeper hook 32 on the cooperating intermediate longitudinal edge portion of the handle 18. These two keepers may be released and the device employed in the manner shown in full lines in Figure 1 or they may be interconnected or engaged in the manner shown in Figure 4 at which time the handles may be said to be latched together.

Assuming that the blades 10 and 22 are unlatched and in the open position seen in Figure 1, the user simply slides the spatula-like blade 10 beneath the segment or section of cake which is to be cut out and removed. Then, the handles are pressed together against the tension of the spring 16 and the cutting blade cuts through the cake or pie from the inner end 34 toward the outer end 36 and effects the cut with required facility and sureness.

It is believed that the instrumentality herein revealed constitutes an innovation and that it is such that it will fulfill the requirements of manufacturers, retailers and users. It is such in simplicity of construction that its features and advantages and mode of use will be clear to the reader. In these circumstances a more detailed description is thought to be unnecessary.

What is claimed as new is as follows:

1. A multipurpose one-piece hand implement for use in the kitchen and for cutting and serving a piece or slice of pie, cake or the like, comprising, in combination, a first handle, a second handle opposed to and movable toward and from said first handle and connected thereto at one end by way of a self-opening spring, an elongate flat-faced spatula-like blade secured at one end to the outer free end of said first handle, said blade having a linearly straight lengthwise edge laterally offset to one side of but parallel to the axis of said first handle, a flat-faced cutter blade also secured at one end to the corresponding free end of the second handle and disposed at right angles to the plane of said first named blade, movable in an arc toward and from said first blade, being likewise laterally offset and alignable with said straight edge and provided with saw teeth constituting cutting elements, said cutter blades being also in a plane at right angles to the plane of said second handle and being joined thereto by way of a twisted bend, a latter having the additional function of a thumb rest, an intermediate portion of one handle being provided with a fixed keeper hook, and an intermediate portion of the other handle provided with a complemental fixed keeper hook, said hooks being releasably engageable with each other.

2. The structure defined in claim 1 and wherein said keeper hooks are located wholly within the marginal limits of the handles and therefore do not project or protrude outside the marginal limits of said handles at any time, that is, whether disengaged or engaged.

References Cited in the file of this patent

UNITED STATES PATENTS

| | | |
|---|---|---|
| 2,010,074 | Fuerst | Aug. 6, 1935 |
| 2,264,486 | Smith et al. | Dec. 2, 1941 |
| 2,600,646 | Hangland | June 17, 1952 |
| 2,650,423 | Phillips | Sept. 1, 1953 |

FOREIGN PATENTS

| | | |
|---|---|---|
| 627,947 | Great Britain | Aug. 18, 1949 |
| 666,802 | Great Britain | Feb. 20, 1952 |